United States Patent
Ottestad

(10) Patent No.: US 9,970,559 B2
(45) Date of Patent: May 15, 2018

(54) PRESSURE VOLUME REGULATOR

(71) Applicant: Aker Subsea AS, Lysaker (NO)

(72) Inventor: Nils T. Ottestad, Husøysund (NO)

(73) Assignee: Aker Solutions AS, Lysaker (NO)

(*) Notice: Subject to any disclaimer, the term of this patent is extended or adjusted under 35 U.S.C. 154(b) by 182 days.

(21) Appl. No.: 14/649,693

(22) PCT Filed: Dec. 2, 2013

(86) PCT No.: PCT/NO2013/050211
§ 371 (c)(1),
(2) Date: Jun. 4, 2015

(87) PCT Pub. No.: WO2014/092581
PCT Pub. Date: Jun. 19, 2014

(65) Prior Publication Data
US 2015/0316162 A1    Nov. 5, 2015

(30) Foreign Application Priority Data

Dec. 11, 2012 (NO) .................................. 20121486

(51) Int. Cl.
| F16K 31/12 | (2006.01) |
| F16K 17/04 | (2006.01) |
| F04B 47/06 | (2006.01) |
| F04D 13/10 | (2006.01) |
| F04D 15/00 | (2006.01) |
| F04D 29/08 | (2006.01) |
| F04D 25/06 | (2006.01) |

(52) U.S. Cl.
CPC .............. *F16K 17/04* (2013.01); *F04B 47/06* (2013.01); *F04D 13/10* (2013.01);
(Continued)

(58) Field of Classification Search
CPC ......... Y10T 137/7826; Y10T 137/7832; Y10T 137/7834; Y10T 137/87877;
(Continued)

(56) References Cited

U.S. PATENT DOCUMENTS 2,555,640 A    6/1951  Garretson
3,854,495 A *  12/1974 Cowley ............. G05D 16/0663
                                                137/505.44
(Continued)

FOREIGN PATENT DOCUMENTS

NO          322566 B1      10/2006
WO    WO-2011161519 A1    12/2011

OTHER PUBLICATIONS

Hodneland, John André Wilhelmsen, "International Search Report," prepared for PCT/NO2013/050211, dated Mar. 4, 2014, four pages.

*Primary Examiner* — Jessica Cahill
(74) *Attorney, Agent, or Firm* — Winstead PC

(57) ABSTRACT

Pressure volume regulator (20) for control of supply and pressure of barrier fluid for pumps and compressors subsea, comprising an inlet (18) for barrier fluid at an inlet pressure, a first outlet (19) and a second outlet (15), the inlet pressure is higher than the first outlet pressure that is higher than the second outlet pressure. The pressure volume regulator is distinctive in that the inlet and the second outlet are interlocked between a movable longitudinal interlock member (5) with valve elements operatively arranged at either end, the length of the interlock member plus said valve elements is shorter than the distance between an open-close valve mechanism of the inlet and an open-close valve mechanism of the second outlet.

7 Claims, 5 Drawing Sheets

Figure 1:
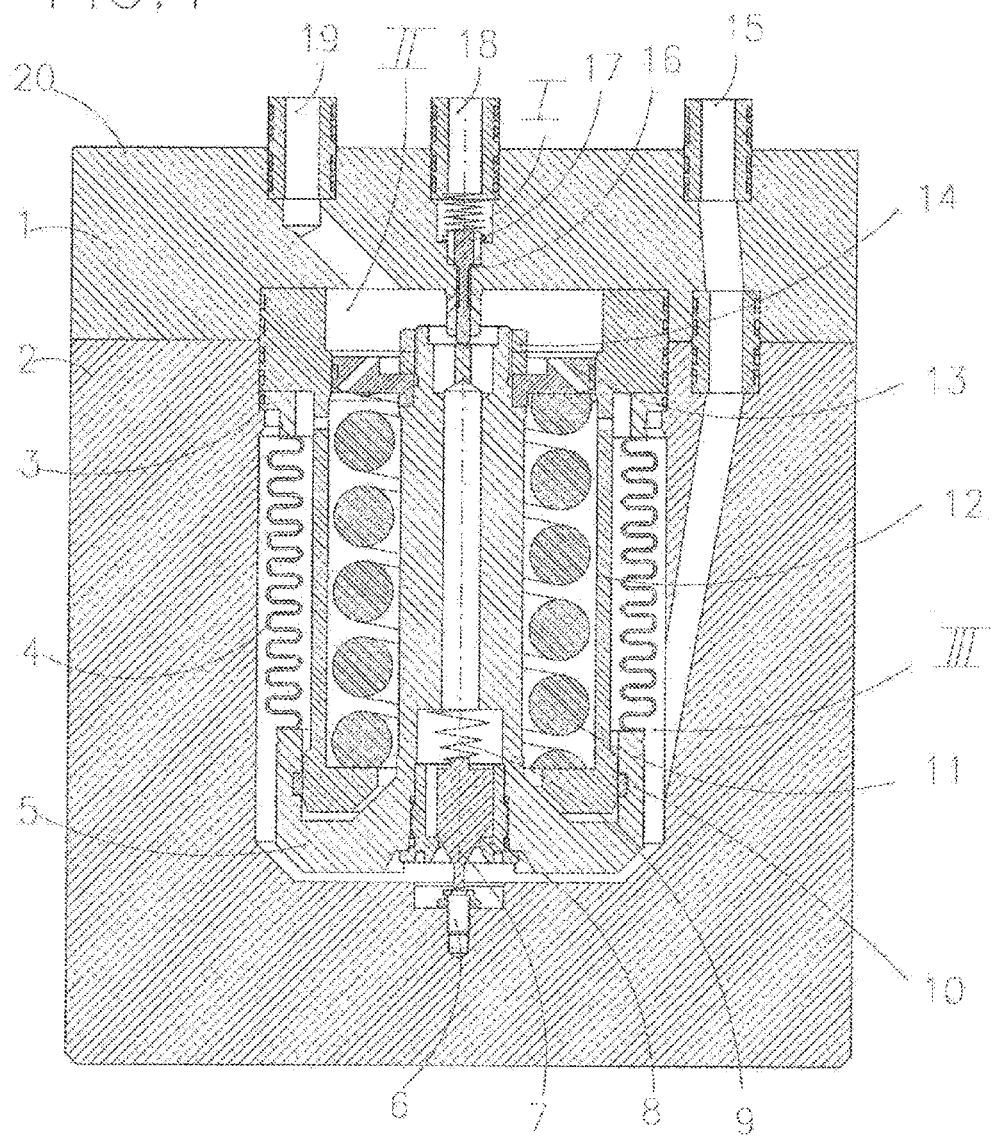

(52) U.S. Cl.
CPC ..... *F04D 15/0077* (2013.01); *F04D 25/0686* (2013.01); *F04D 29/086* (2013.01); *Y10T 137/7762* (2015.04)

(58) Field of Classification Search
CPC ..... Y10T 137/87708; Y10T 137/87756; Y10T 137/7762; F16K 17/04; F04B 47/06; F04D 13/10; F04D 15/0077; F04D 25/0686; F04D 29/086
See application file for complete search history.

(56) References Cited

U.S. PATENT DOCUMENTS

| | | | | |
|---|---|---|---|---|
| 3,955,597 | A * | 5/1976 | Oneyama | F15B 13/0405 137/625.25 |
| 5,379,761 | A * | 1/1995 | Schuler | A62B 9/02 128/204.26 |
| 6,059,539 | A | 5/2000 | Nyilas et al. | |
| 8,069,676 | B2 * | 12/2011 | Kamen | B01D 1/221 62/291 |
| 8,167,001 | B2 * | 5/2012 | Larsen | G05D 16/106 137/883 |
| 2004/0007269 | A1 * | 1/2004 | Larsen | G05D 16/106 137/505.25 |
| 2008/0066804 | A1 * | 3/2008 | Rudoy | F16K 17/406 137/68.11 |
| 2008/0260539 | A1 * | 10/2008 | Stinessen | F04D 25/0686 417/26 |
| 2010/0303639 | A1 | 12/2010 | Alfes et al. | |
| 2013/0146299 | A1 * | 6/2013 | Tomter | F04B 47/06 166/340 |

* cited by examiner

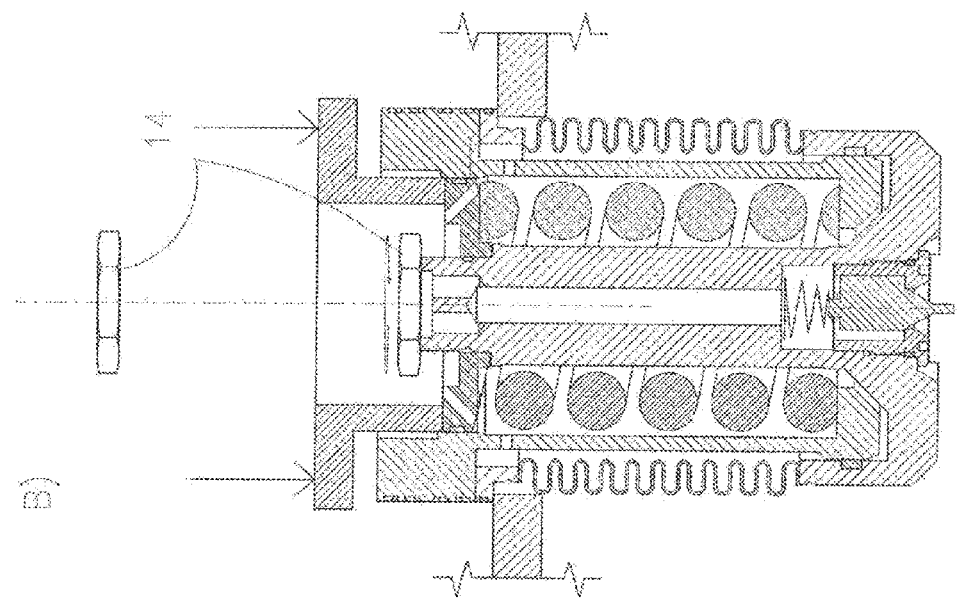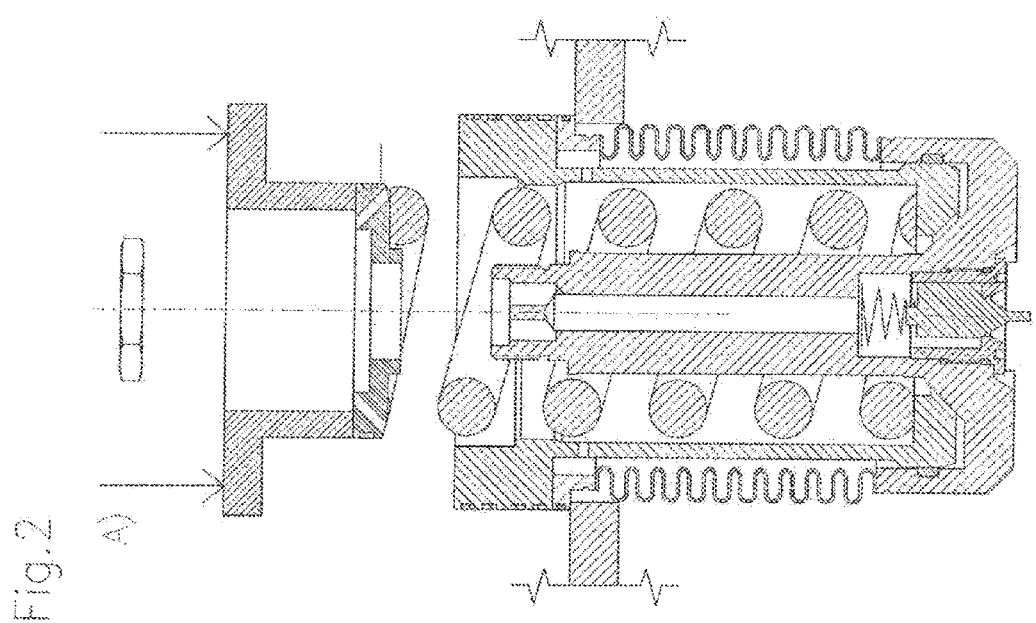
Fig. 2

PRESSURE VOLUME REGULATOR

FIELD OF THE INVENTION

The present invention relates to equipment for pressure boosting subsea. More specifically, the invention provides a novel pressure volume regulator for control of supply and pressure of barrier fluid for pumps and compressors subsea.

BACKGROUND OF THE INVENTION AND PRIOR ART

A pressure volume regulator for use subsea for supply and pressure control of the barrier fluid supply for pumps and compressors, is described and illustrated in Norwegian patent publication NO 322 566. The objective of a pressure volume regulator is to control supply and dump of lubrication fluid, also termed barrier fluid, as required to secure an overpressure in the motor cavity. More specifically, the barrier fluid in the motor cavity is to be held at some overpressure in relation to the pump or compressor pressure, in order to eliminate flow in the direction from the pump or compressor to the motor. The regulator is typically arranged with one supply line of barrier fluid connected to an inlet, a first outlet connected to a motor compartment and a second outlet connected to a pump or compressor compartment. The pressure of the motor compartment is to be maintained at a higher level than the pressure of the pump or compressor compartment. The leakage path of barrier fluid in a motor/pump unit will typically be through the shaft seal separating the motor and pump/compressor cavity. By maintaining some overpressure of the fluid in the motor cavity, leakages can only flow towards the pump/compressor. Accordingly, the fluid in the motor cavity will act as a barrier against contamination by particles and contaminating fluid which else could leak from the pump or compressor into the motor and shorten the service life of the motor. The barrier fluid also acts as a coolant for the motor and lubricant for the bearings.

The pressure volume regulator of NO 322 566 comprises one inlet and at least two outlets. The pressure is reduced for each subsequent outlet, in the direction of flow from the inlet, by having a pressure controller, such as a pre-tensioned check valve or pressure control valve between each outlet, opening at a predetermined value controlled by the pre-tensioning. If the pressure difference between an upstream outlet and a downstream outlet exceeds a predetermined value, the valve opens. The valve element area on which the inlet flow pressure acts is of the same order of magnitude as the valve element area on which the outlet flow pressure acts.

There is a possibility for having both the inlet flow supply valve and the check valve on the second or last outlet open at the same time. This may result in a continuous dumping of the barrier fluid. Even though this kind of functional failure require a very stiff or incompressible volume downstream the second or last outlet, it is crucial to eliminate the risk for this to happen.

Also, it would be beneficial if the reliability of the pressure volume controller could be improved even further.

The objective of the present invention is to provide a pressure volume regulator that eliminates the failure mechanism mentioned above and also provides improved reliability and a prolonged service life.

SUMMARY OF THE INVENTION

The invention provides a pressure volume regulator for control of supply and pressure of barrier fluid for pumps and compressors subsea, comprising an inlet for barrier fluid, a first outlet and a second outlet. The inlet pressure is higher than the first outlet pressure that again is higher than the second outlet pressure. The pressure volume regulator is distinctive in that the inlet valve mechanism and the second outlet valve mechanism are interlocked by a movable longitudinal interlock member with valve elements operatively arranged at either end, the length of the interlock member plus said valve elements is shorter than the distance between an open-close valve mechanism of the inlet and an open-close valve mechanism of the second outlet.

With the interlock function as described, the inlet and the second outlet cannot be in position open for flow at the same time, thereby eliminating the risk of functional failure as mentioned above.

The regulator according to the invention can have many different embodiments. In all preferred embodiments, the position of the interlock member and thereby the open-close position of the inlet and outlet valves, are in substance controlled by the pressure in the second outlet and associated compartments or volumes of the controller, and not by the inlet pressure. This is achieved by letting the pressure difference between the first and the second discharge pressure influence a much larger area than the inlet pressure, which influences the inlet valve. Thereby, the controller becomes able to keep the pressure difference between the first and the second outlet pressure at a fairly constant level, even when the inlet pressure is subjected to large variations. Preferably, the interlock member can be moved between an upper position where the inlet is open and the second outlet is closed, a neutral position where both the inlet and the second outlet are closed and a lower position where the inlet is closed and the second outlet is open.

The regulator preferably comprises an interlock member having shape like a mushroom with a hat and a hollow stem, with an open-close spring loaded valve mechanism in the hat end toward the second outlet and with a push rod in the end toward the inlet, the push rod can push the inlet valve to open position. A biasing spring is preferably arranged around and along the stem of the interlock member in order to provide an upward acting force that ensures a higher pressure in the first outlet compared to the reference pressure of the second outlet. In this context, upward means toward the inlet, as seen on the orientation of the figures, where the mushroom shaped interlock member is vertically oriented with the stem upward toward the inlet and the hat is oriented downward. The interlock element is pushed toward the inlet valve so as to make it open when the force created by the pressure of the second outlet plus the force provided by the biasing spring is larger than the force created by the pressure of the first outlet. The interlock element is pushed toward the second outlet valve so as to make it open when the force from the pressure of the first outlet is larger than the force created by the pressure in the second outlet chamber plus the force provided by the biasing spring.

The regulator preferably comprises bellows arranged fluid tight between a fixed part of the regulator housing and an outer part of the hat of the interlock member toward the second outlet. The bellows are closed for fluid flow between a reference chamber of the second outlet and the first outlet chamber. This reference chamber is outside the bellows and below the hat shaped end of the interlock member, assuming the mushroom shaped interlock member has the hat shape at the lower end. The inlet and the valve parts and valve seat therein, the interlock member stem, the biasing spring and the valve element arranged in the hat end of the interlock member are positioned inside the bellows. The inside of the bellows thereby provides a clean barrier fluid chamber inside the bellows, in which critical components and valve seats are arranged. Since there is lower pressure in pumps or compressors that are connected to the second outlet outside the bellows, the risk of contamination into said barrier fluid chamber is minimised. This feature prolongs the service life and increases the reliability since all critical components and sealing surfaces are protected by the relative clean fluid inside the bellows.

As mentioned, the surface area onto which the pressure of the fluid in the second outlet acts is preferably much larger than the surface area onto which the pressure of the inlet acts. The ratio between said areas should preferably be about two to three orders of magnitude, and always be larger than the ratio of the inlet pressure to the second outlet pressure. A ratio of about 600 is feasible.

Preferably all components of the regulator are made of metal or ceramic materials, not polymers of any kind. Preferably the bellows are made of a fatigue and corrosion resistant material, such as HASTELLOY™ C 276.

The invention also provides use of a pressure volume regulator according to the invention, for control of barrier fluid supply to a subsea pump or compressor.

FIGURES

Figure 3:
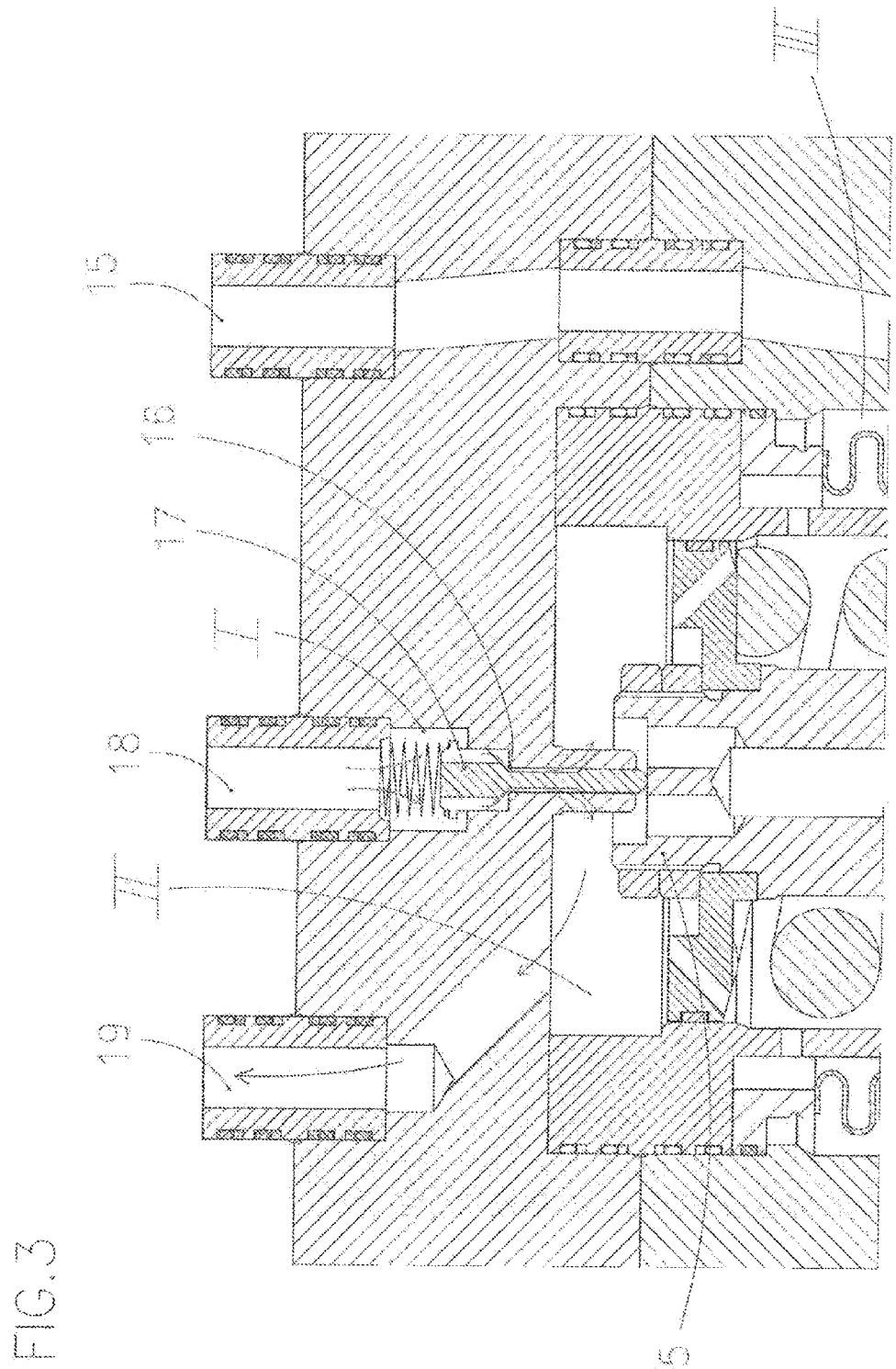
Figure 4:
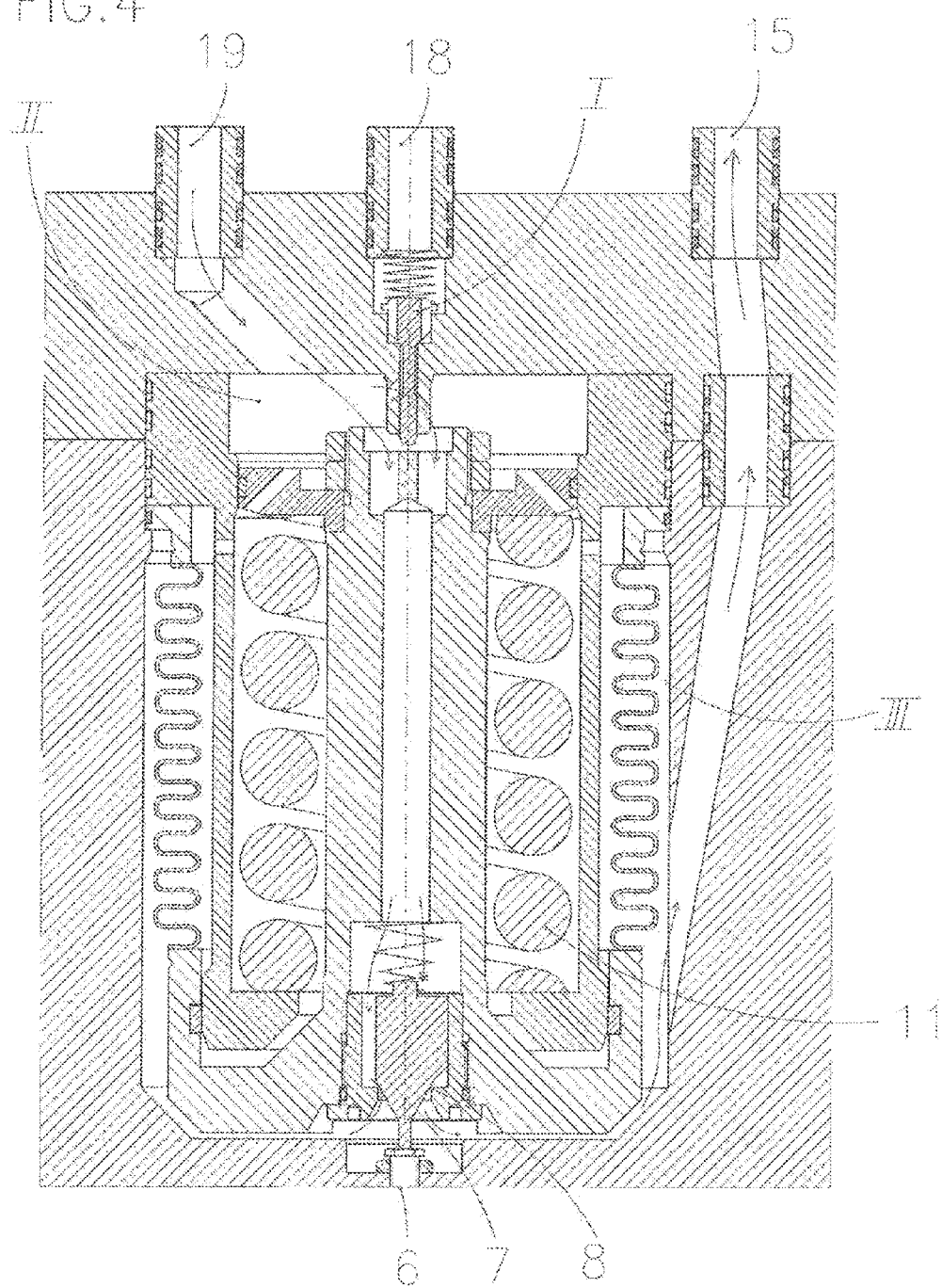
Figure 5:
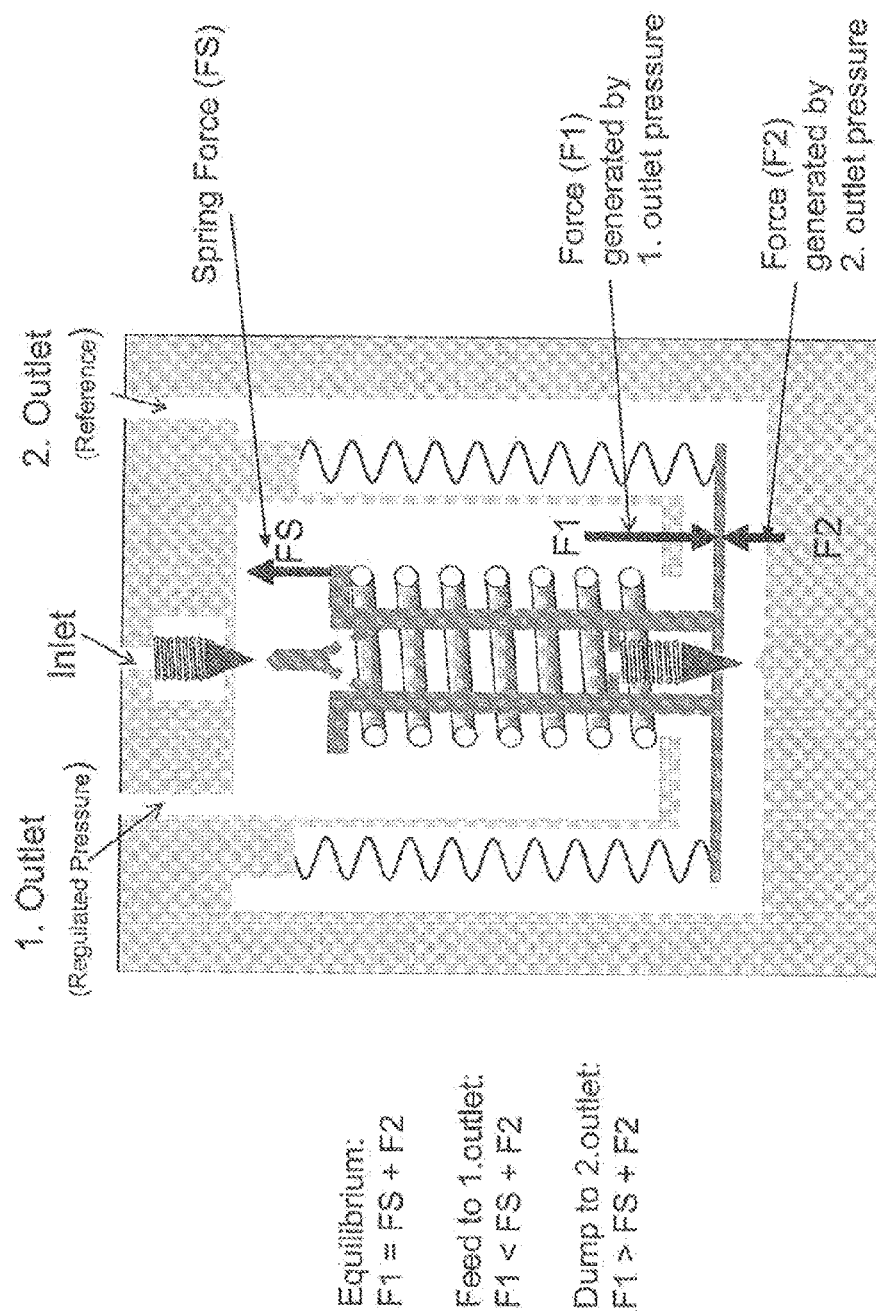

The invention is illustrated with five figures, of which:

FIG. 1 is a longitudinal section of a pressure volume regulator of the invention, FIG. 2 illustrates assembly of the regulator of FIG. 1, FIG. 3 illustrates details in mode of feeding, for the regulator of FIG. 1, FIG. 4 illustrates the regulator of FIG. 1, in a mode of dumping, and FIG. 5 is another embodiment of a pressure volume regulator of the invention, quite similar to the embodiment illustrated on FIGS. 1-4, but simplified and easier to understand.

DETAILED DESCRIPTION

Reference is made to FIG. 1, illustrating a pressure volume regulator 20 of the invention in longitudinal section. More specifically, a pressure volume regulator 20 for control of supply and pressure of barrier fluid for pumps and compressors subsea, is illustrated. The regulator 20 comprises an inlet 18 for barrier fluid at an inlet pressure, a first outlet 19 and a second outlet 15, the inlet pressure is higher than the first outlet pressure that is higher than the second outlet pressure. The inlet will be connected to a barrier fluid supply, held at a pressure of for instance 400 bar. The first outlet 19 will be connected to a motor or a motor compartment of a pump or compressor, to be held at for example 70 bar. The second outlet 15 will be connected to a pump or compressor, and is to be held at pressure of for example 58 bar. The pressures are just typical examples and can be varied broadly, but the inlet pressure will always be higher, usually by an order or two of magnitude, than the outlet pressures. The inlet 18 and the second outlet 15 are interlocked by a movable longitudinal interlock member 5 with valve elements 17, 16, 7, 8, 9 operatively arranged at either end. The length of the interlock member plus said valve elements is shorter than the distance between an open-close valve mechanism of the inlet and an open-close valve mechanism of the second outlet.

The interlock member 5 ensures that the inlet and the second outlet can never be in an open position at the same time, thereby eliminating the possibility for simultaneous supply and dumping of liquid. The interlock element and connected or associated valve elements at either end, are in total simply too short for having both the inlet and the second outlet open at the same time. An adjustment screw 6 is arranged with a locking nut that makes it possible to adjust the dead band of the interlock member movement as required to ensure proper function of the interlock member. The illustrated embodiment comprises an interlock member 5 having shape like a mushroom with a hat and a hollow stem, with an open-close spring loaded valve mechanism 7-9 in the hat end toward the second outlet, and with a push rod in the stem end that can push the inlet valve 16, 17 to the open position. The interlock member can have many embodiments; it can be divided into several parts, and it must not have a hollow stem, provided that the length, including integrated valve parts, is too short for having the inlet and second outlet open at the same time. A biasing spring 11 is arranged around and along the stem of the interlock member, acting from a disk 13 that is fixed to the interlock member 5 via a sleeve 12 that is fixed to regulator housing 1, 2. This spring 11 ensures a higher pressure in an outlet chamber (II) of the first outlet 19 than in a reference chamber (III) of the second outlet 15. The inlet 18 is acting on the inlet valve in chamber (I). Said sleeve 12 is aimed to ensure plain axial movement of the interlock member 5 guided by the sleeves 10. The pressure of the second outlet, the reference chamber (III), exerts a pressure on the hat of the interlock member, so as to push the inlet valve into the open position when this pressure plus the pressure provided by the biasing spring is larger than the pressure of the first outlet chamber.

Furthermore, the illustrated regulator comprises bellows 4 arranged fluid tight between a fixed part 3 of the regulator housing 1, 2 and the outer part of the hat of the interlock member 5. When the valve 7, 8, 9 is closed, the interior of the bellows and the inside of the hat is a closed chamber connected to the first outlet 19 and inlet valve 16, 17. Accordingly, when the valve 7, 8, 9 is closed, there is no passage for fluid flow between the reference chamber of the second outlet 15, which is outside the bellows and may contain contaminated fluid, and the first inlet chamber 19 inside the bellows. Since the interior of the bellows contains clean barrier fluid at an overpressure, a possible leakage in valve 7, 8, 9 will cause clean fluid to flow from the interior of the bellows to the reference chamber of the second outlet 15. The inlet valve 16, 17, the interlock member stem, the biasing spring 11 and the valve elements 7, 8, 9, are sensitive components that should not be subjected to contaminated fluid. These components are arranged inside said clean barrier fluid chamber, thereby increasing the reliability and service life of the regulator.

As evident, the area that is influenced by the pressure difference between the outlet chamber II and the reference chamber III is much larger than the surface area of the inlet valve, which is influenced by the inlet pressure. The latter area is the projected area in the direction of movement of the valve member 17, closing against the seat 16. Thereby small variations in this pressure difference will control the movement and the operative position of the valves of the regulator even when a large pressure is applied to the inlet 18.

Further reference is made to FIG. 2, illustrating assembly of the regulator of FIG. 1. More specifically, the interior parts of the bellows are arranged in place first, then the biasing spring is compressed and fixed in position by locking nuts 14 (FIG. 1), using an adapted tool. Then the length of the bellows assembly is to be precisely measured, whereby correct adjustment of the screw 6 can be performed.

FIG. 3 illustrates the regulator in mode of feeding. The direction of flow, from the inlet 18 through the inlet valve, into the outlet chamber (II) and further out to the first outlet 19 is illustrated by arrows. In the illustrated feeding mode, the pressure of the outlet chamber (II) is lower than the pressure of the reference chamber (III) plus the pressure provided by the biasing spring.

FIG. 4 illustrates the regulator in a mode of dumping. The arrows illustrate that the fluid is directed through the first outlet 19 and the bore in the stem of the interlock element, through the valve in the hat part of the interlock element, out into the reference chamber (III) and then out through the second outlet 15. In the illustrated dumping mode, the pressure of the outlet chamber (II) is larger than the pressure of the reference chamber (III) plus the pressure provided by the biasing spring.

Further reference is made to FIG. 5, illustrating another embodiment of a pressure volume regulator of the invention, quite similar to the embodiment illustrated on FIGS. 1-4, but simplified and easier to understand. For clarity, some text is included in the figure. More specifically, the conditions for equilibrium, feed to the first outlet and dump to the second outlet, are given as equations, respectively. The governing forces: Spring Force (FS), Force (F1) generated by $1^{st}$ outlet pressure and Force (F2) generated by $2^{nd}$ outlet pressure, their location and direction are illustrated, and the valve elements in the inlet and toward the second outlet are illustrated clearly. In the equilibrium modus: F1=FS+F2, the interlock member is in a neutral or intermediate position where both the inlet and the second outlet are closed. In the feed to the $1^{st}$ outlet modus: F1<FS+F2, the interlock member is in an upper position, which means abutting and pushing open the inlet valve mechanism, where the inlet is open but the second outlet is closed. In the dump to the $2^{nd}$ outlet modus: F1>FS+F2, the interlock member is in a lower position, which means abutting and pushing open the $2^{nd}$ outlet, where the inlet is closed but the $2^{nd}$ outlet is open. In the FIG. 5, the interlock member is in a neutral or equilibrium position, hence, both the inlet and the second outlet are closed. The pressure volume regulator of the invention can be different from the illustrated embodiments. The pressure volume regulator of the invention can include any feature as here described or illustrated, in any operative combination, each such operative combination is an embodiment of the present invention.

The invention claimed is:

1. A pressure volume regulator for control of supply and pressure of barrier fluid for pumps and compressors subsea, the pressure volume regulator comprising:
    an inlet for barrier fluid at an inlet pressure;
    a first outlet and a second outlet;
    wherein the inlet pressure is higher than a first outlet pressure, the first outlet pressure being higher than a second outlet pressure;
    wherein the inlet and the second outlet are interlocked by a movable longitudinal interlock member;
    wherein inlet valve elements are operatively arranged at an end of the inlet;
    wherein outlet valve elements are arranged at an end of the second outlet;
    wherein the movable longitudinal interlock member extends in a longitudinal direction between the inlet and the second outlet and is movable in said longitudinal direction by pressurized fluid in the inlet and the second outlet, respectively;
    wherein a length of the movable longitudinal interlock member, said inlet valve elements, and said outlet valve elements in a closed position is shorter than a distance between an open position of the inlet valve elements and an open position of the outlet valve elements; and
    wherein the movable longitudinal interlock member is configured to ensure that the inlet and the second outlet are never in the open position for flow simultaneously.

2. The pressure volume regulator according to claim 1, wherein the movable longitudinal interlock member can be moved between an upper position, a neutral position, and a lower position;
    wherein, in the upper position, the inlet is open and the second outlet is closed;
    wherein, in the neutral position, both the inlet and the second outlet are closed;
    wherein, in the lower position, the inlet is closed and the second outlet is open; and
    wherein a position of the movable longitudinal interlock member is governed in substance by a pressure difference between the first outlet and a reference chamber of the second outlet.

3. The pressure volume regulator according to claim 2, wherein:
    the movable longitudinal interlock member is shaped like a mushroom with a hat and a hollow stem and with a push rod in an end toward the inlet, the push rod being configured to push a valve of said inlet valve elements to an open position;
    a biasing spring arranged around and along the hollow stem of the movable longitudinal interlock member, acting from a disk that is fixed to the movable longitudinal interlock member to a sleeve that is fixed to regulator housing ensuring a higher pressure in an outlet chamber of the first outlet than in the reference chamber of the second outlet; and
    the pressure of the reference chamber exerts a pressure on the hat of the movable longitudinal interlock member so as to push the movable longitudinal interlock member toward the inlet so as to open a valve of said inlet valve elements when a pressure of the second outlet and a pressure provided by the biasing spring is larger than the pressure of the outlet chamber of the first outlet.

4. The pressure volume regulator according to claim 3, further comprising:
    bellows arranged fluid tight between a fixed part of a regulator housing and an outer part of the hat of the movable longitudinal interlock member;
    wherein the bellows are closed for fluid flow between the reference chamber of the second outlet and the outlet chamber of the first outlet, wherein the reference chamber is outside the bellows;
    the hollow stem of the movable longitudinal interlock member, the biasing spring and the outlet valve elements arranged in the hat end of the interlock member are positioned inside the bellows; and
    wherein the inside of the bellows provide a clean barrier fluid chamber.

5. The pressure volume regulator according to claim 4, wherein the bellows comprise fatigue and corrosion resistant material.

6. The pressure volume regulator according to claim 1, wherein a surface area, onto which the pressure of the fluid in the second outlet acts, is larger than a surface area onto which the pressure of the inlet acts by at least one of one order of magnitude, two orders of magnitude, and two to three orders of magnitude.

7. The pressure volume regulator according to claim 1, wherein all components are made of metal or ceramic materials, not polymers of any kind.

* * * * *